July 9, 1940.　　　　　G. B. WOOD　　　　　2,207,424
GROUND WORKING TRAILER
Filed Jan. 3, 1939　　　　5 Sheets-Sheet 1
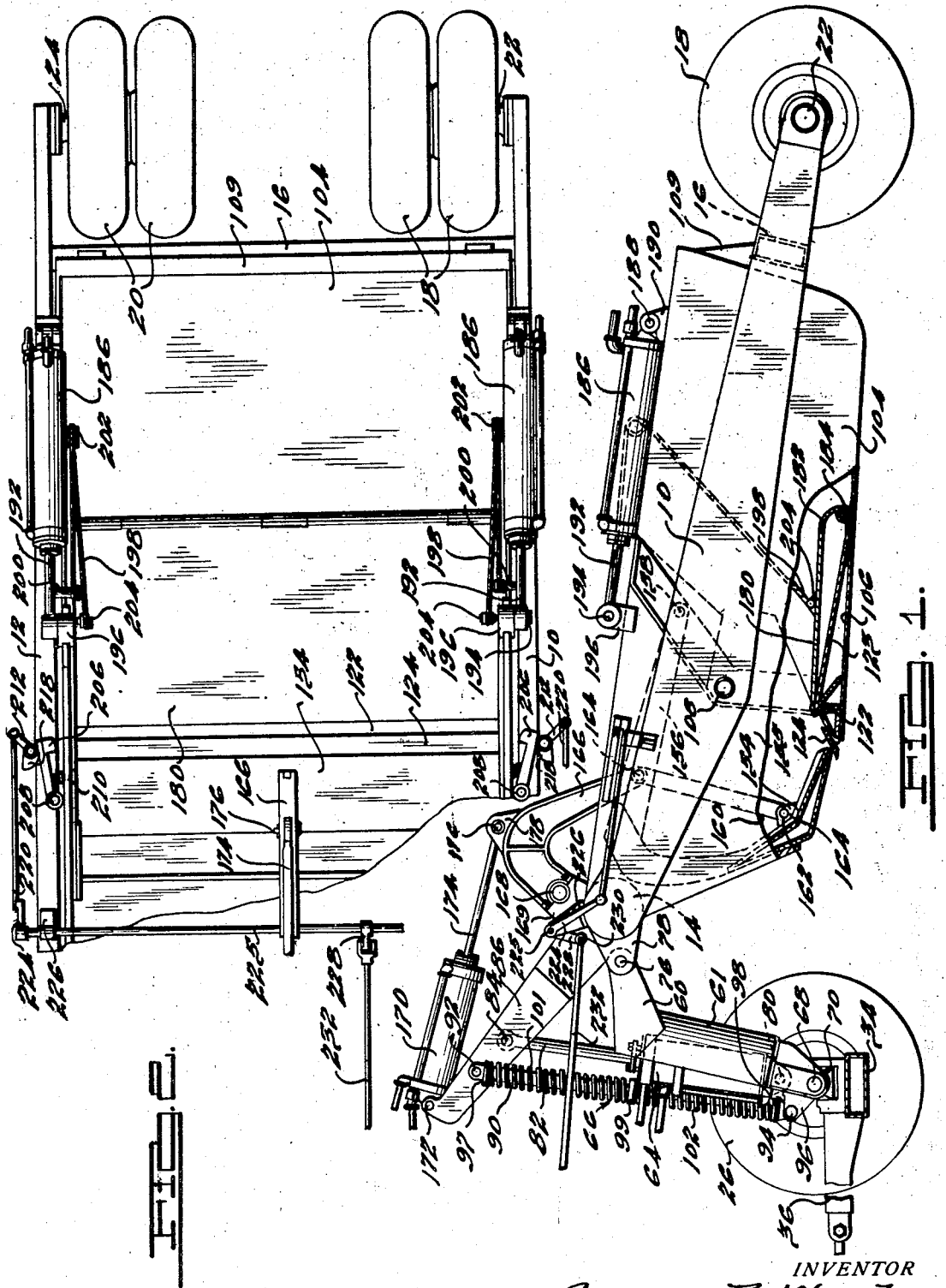
INVENTOR
George B. Wood.
BY
Harness, Dickey & Pierce.
ATTORNEYS.

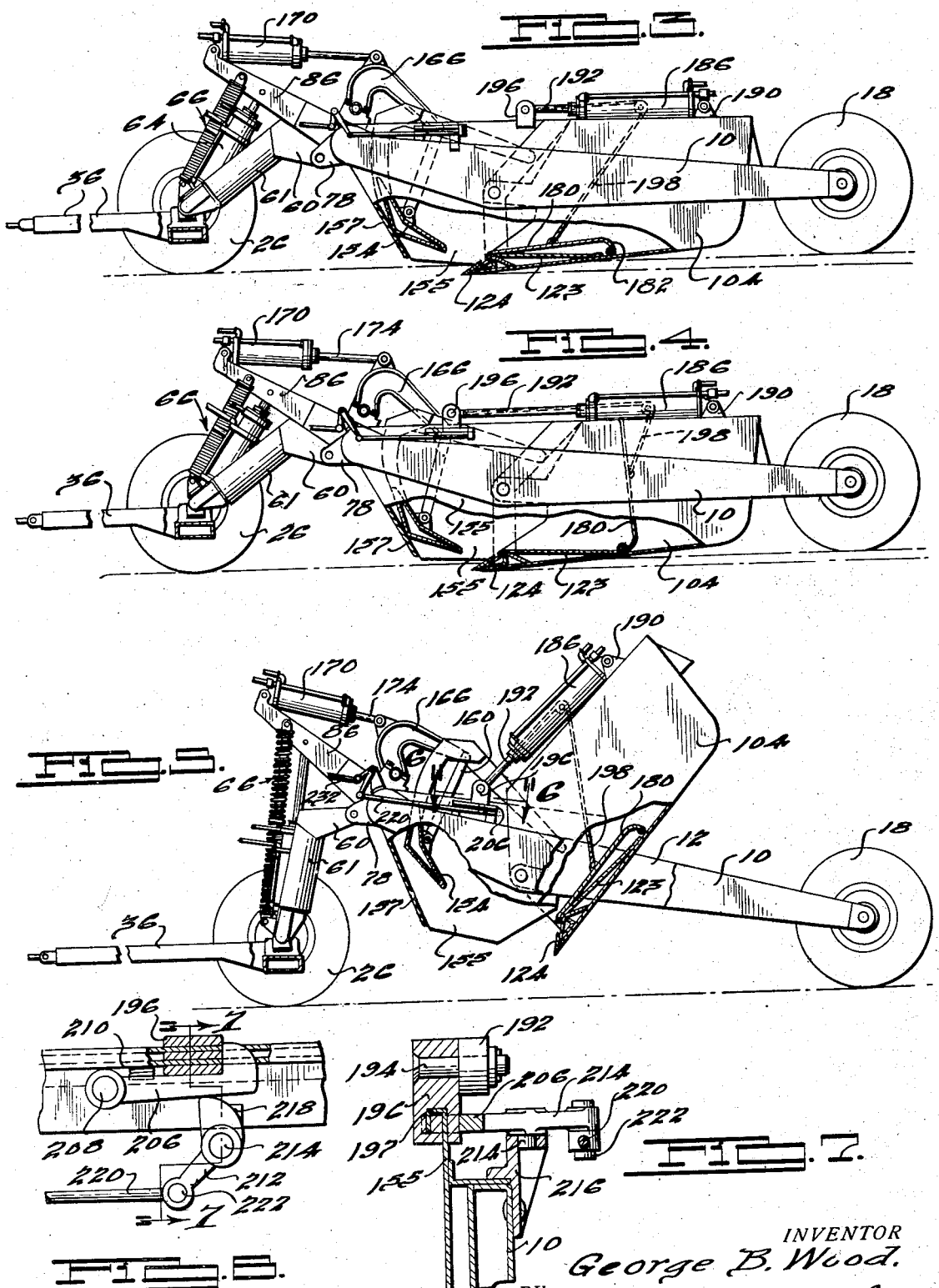

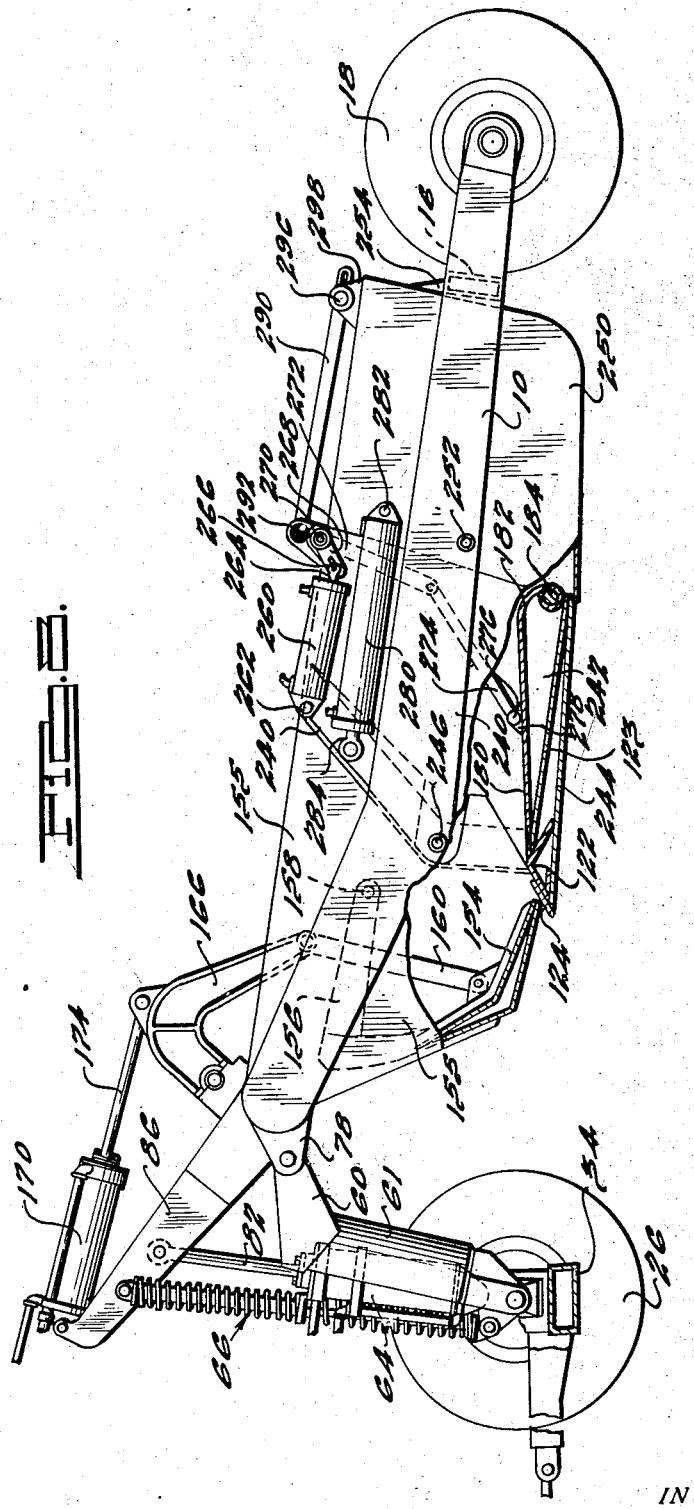

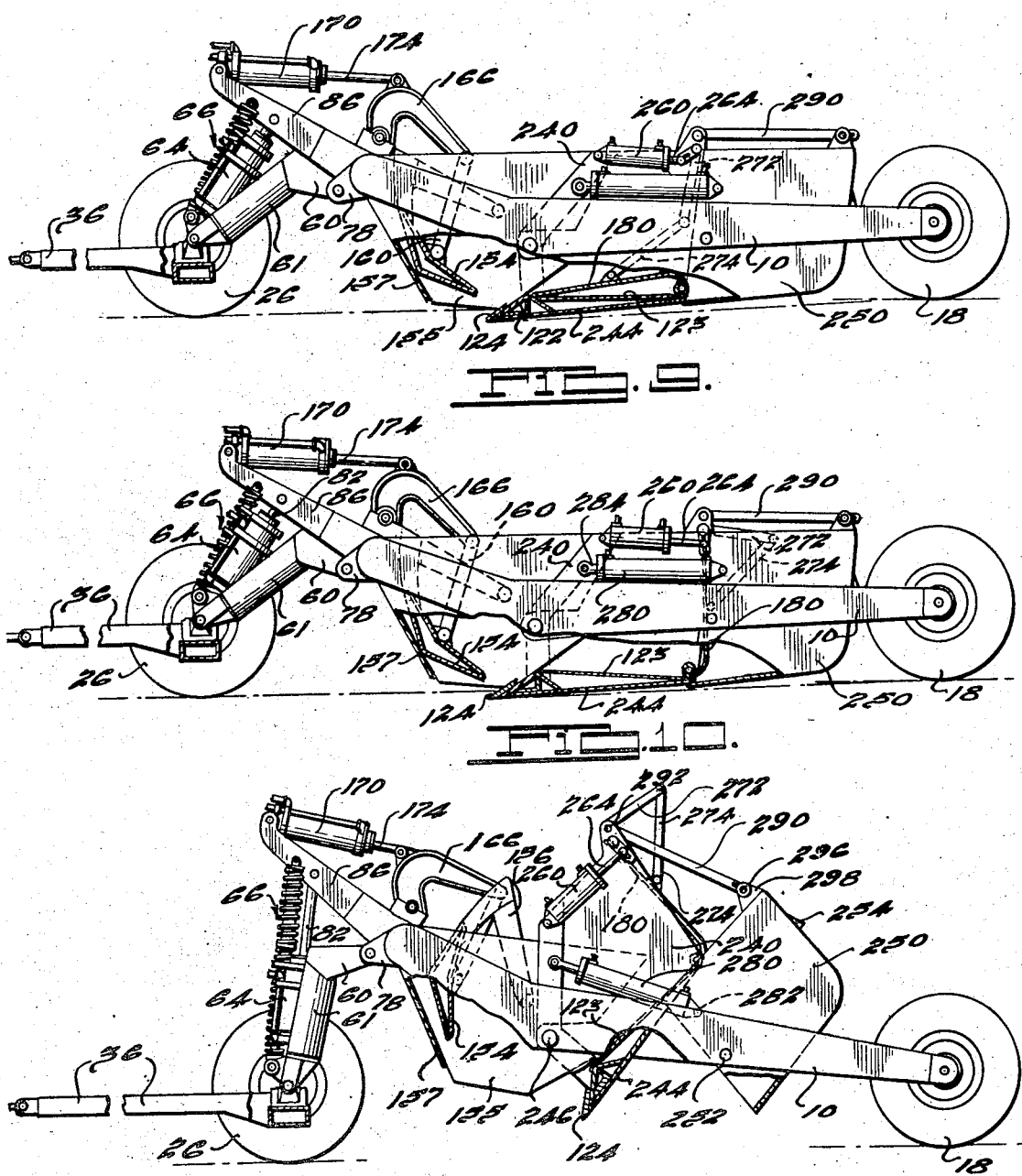

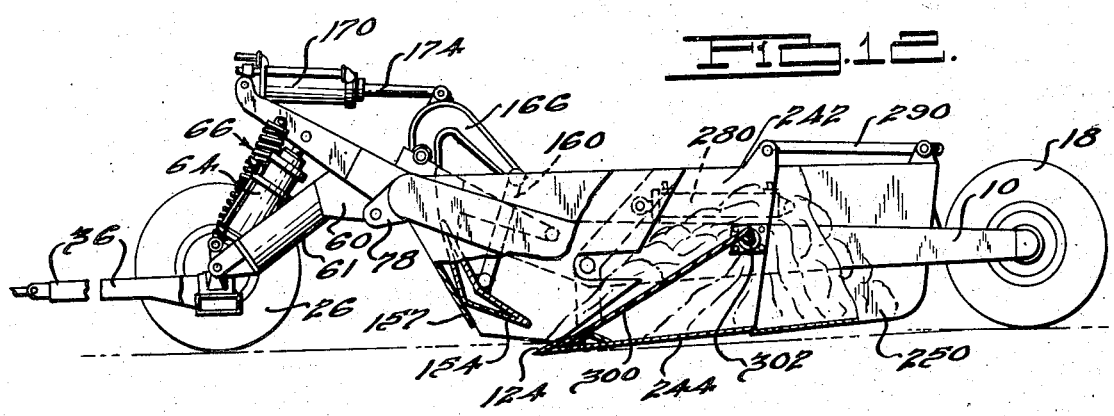
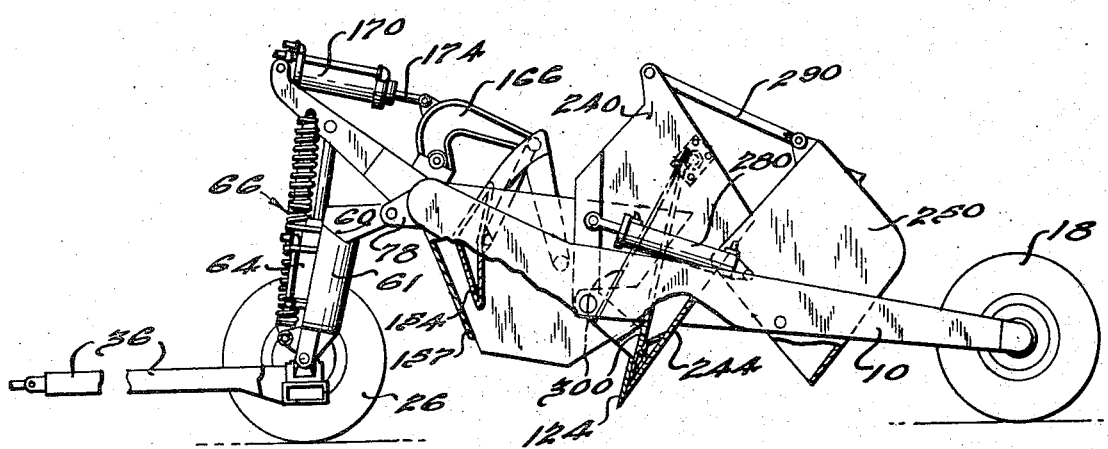
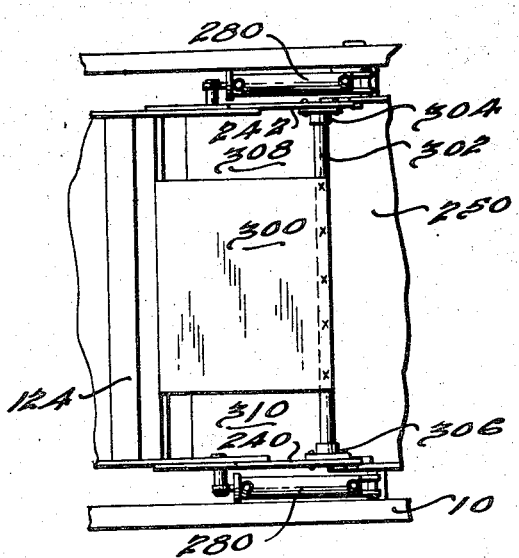

Patented July 9, 1940

2,207,424

UNITED STATES PATENT OFFICE 2,207,424

GROUND WORKING TRAILER

George B. Wood, Detroit, Mich., assignor to Gar Wood Industries Inc., Detroit, Mich., a corporation of Michigan Application January 3, 1939, Serial No. 249,004

4 Claims. (Cl. 37—126)

This invention relates to improvements in scrapers, and particularly relates to scrapers in which the scraper blade is associated with a dirt hauling scoop, arranged within a frame structure, which is utilized as a means for transporting the dirt graded or scraped from a surface.

Further, the present invention relates to the type of structure disclosed and claimed in the pending application of Edward R. Barrett, Serial No. 232,708, filed October 1, 1938, in which the scoop means are pivotally connected directly to the main frame structure and are raised and lowered by lifting and lowering the forward end of the frame.

One of the primary objects of the present invention is to provide improved scrapers of the type mentioned which have substantially greater capacity than heretofore.

Another object of the invention is to provide improved scraper structures of the type mentioned in which means are associated with the interior of the bowl for distributing the load disposed within the bowl, so that the bowl has greater capacity than prior structures.

Other objects of the invention will become apparent from the following specification, the drawings relating thereto, and from the claims hereinafter set forth.

In the drawings, in which like numerals are used to designate like parts in the several views throughout:

Figure 1 is a side elevational view, with parts broken away, showing parts in cross section, of a load-hauling excavating machine embodying features of the present invention;

Fig. 2 is a fragmentary top plan view of the structure shown in Fig. 1;

Figs. 3 to 5 are side elevational views illustrating the parts in various positions of adjustment for performing the digging or excavating, and dumping functions of the structure;

Fig. 6 is an enlarged cross-sectional view taken substantially along the line 6—6 of Fig. 5;

Fig. 7 is a cross-sectional view taken substantially along the line 7—7 of Fig. 6;

Fig. 8 is a view similar to Fig. 1 illustrating a modified form of the present invention; and Figs. 9 to 11 are side elevational views of the structure shown in Fig. 8 illustrating the parts in various positions of adjustment for performing the digging or excavating and dumping functions of the structure.

Figs. 12, 13 and 14 are views showing a modification comprising a baffle plate for guiding the dirt upwardly and rearwardly into the rearmost receptacle, Fig. 13 showing the device in dumping position, and Fig. 14 being a fragmentary plan view showing the width of the baffle plate relative to the receptacle in which it is mounted.

Referring to the drawings, and referring particularly to Figs. 1 to 7 thereof, the main frame structure comprises longitudinal, opposite side beams 10 and 12 rigidly joined at their forward ends by a tubular cross beam 14 and joined adjacent their rear ends by a cross beam 16 of box section. Two sets of paired truck wheels 18 and 20 are mounted on horizontally and transversely aligned stub axles 22 and 24, respectively, which are fixed to the rear ends of side beams 10 and 12, respectively, to support the rear end of the frame. The forward end of the frame is supported by a connection with a pair of steering wheels 26 mounted relatively close together on suitable spindles at opposite ends of a cross axle 34. A draw bar 36, having rearwardly directed yoke portions, is attached to the axle 34 for connection with a tractor or the like.

The connection between the main frame and the axle 34 is similar to that disclosed in the Barrett application above referred to and comprises a pair of yoke arms 60 integrally secured to the upper end of a semi-cylindrical strut member 61, a hydraulic cylinder mechanism 64 and resilient connecting means generally designated 66. The strut member 61 is pivotally attached at its lower end by a horizontal pin 68 to a universal knuckle 70 which is pivoted on the medial part of a pin (not shown) which in turn is disposed at right angles to the pin 68 and is mounted at its ends in upright spaced arms of a fitting which is centrally disposed to the axle 34. The fitting includes a vertical king pin which is pivotally mounted to the axle member centrally thereof.

The arms 60 are angled rearwardly from the strut 61 and are pivotally attached by pivot pins 76 to spaced ears 78 on the cross beam 14 and are equally spaced at opposite sides of the median point of the beam, thus permitting these arms to swing in vertical planes only.

The hydraulic power mechanism 64 is pivotally mounted at its lower end on a cross pin 80 which extends through a fitting welded to the lower end of post 61. The power mechanism 64 includes a piston rod 82 which is pivotally attached at its outer upper end by a bolt 84 to a forwardly and upwardly directed extension 86. The extension 86 is rigidly fixed to the cross beam 14 substantially at its center.

The resilient connecting means 66 include a pair of spring mechanisms or units, one unit disposed at each side of the forward extension 86. The spring units, which are both of the same construction, are disclosed and claimed in the copending application of Jack B. Haile, filed August 10, 1938, Serial No. 224,131, and assigned to the assignee of the present invention.

The Haile application may be referred to for a complete description of the resilient connecting means 66, but it is merely necessary for an understanding of the present invention to say that each unit 66 includes a telescoping strut 90 which is pivotally mounted by a pivot pin 92 to the extension 86 at its upper end and is pivotally mounted by a pivot pin 94 to the forwardly extending end of a bracket 96 which is secured to the strut 61. Stop means 97, 98, and 99 are fixed to the strut 90 at the top, bottom, and median points, respectively. Coil springs 101 and 102 are mounted in embracing relationship to the telescopic strut 90 and are so disposed that the ends of the spring 101 abut against the stops 97 and 99, and the ends of the spring 102 abut against the stops 98 and 99. The springs 101 and 102 are of such strength and construction that they will support the machine when fully loaded.

By the application of a hydraulic medium to the mechanism 64, the piston rod 82 is extended from its retracted position as shown in Figs. 3 and 4 to its extended position as shown in Fig. 5. The strut 61 is thus swung from a rearwardly inclined position, as shown in Figs. 3 and 4, to a substantially vertical position, as shown in Fig. 5, to thereby elevate the forward end of the main frame.

The main body portion of the scraper includes a generally box-like scraping and carrying receptacle forming a rear section and a forward part. The rear section is in the shape of a bowl 104 having a rear wall, side walls and a floor 106. The bowl 104 is open at the top and its forward end. The bowl 104 is pivotally mounted on oppositely disposed pivot pins 108, which may be suitably fixed to the frame members 10 and 12, and a transversely extending stop 109 is fixed to the rear wall of the bowl and is adapted to abut against the top surface of the frame member 10 to limit the downward movement of the bowl relative to the frame. The means for pivoting the bowl 104 for the purpose of dumping the load contained therein will be described in detail hereinafter.

A transversely extending baffle member 122 is fixed to the floor 106 of the bowl 104 adjacent the leading edge thereof. The baffle member 122 has a substantially smooth upwardly and rearwardly inclined forward wall portion, and a downwardly and rearwardly sloping rear wall portion thus forming a closed box section of substantially triangular cross section. A transversely extending scraper blade 124 is fixed to the forward leading edge of the baffle 122 adjacent the bottom thereof and is designed for the grading or scraping operation.

The adjustment of this blade 124 relative to the ground is effected by the elevating and lowering of the main frame by actuation of the hydraulic mechanism 64; and as the dirt passes upwardly over the blade 124, it is caused to pass upwardly over the smooth, rearwardly inclined surface of the baffle 122 and be disposed within the receptacle to the rear of the baffle. A floor member 123 is fixed to the floor 106 and is also fixed to the top of the baffle member 122 and extends transversely of the receptacle to provide a load-supporting surface.

By the use of this upwardly and rearwardly inclined, smooth baffle, the capacity of the scraper is materially increased because the dirt which may be piled within the receptacle is limited by the maximum angle which such dirt, being forced upwardly over the outer surface of another pile of dirt, will assume. This angle is materially smaller than the angle of the inclined baffle 122, so that with the baffle 122 the capacity of the receptacle is materially increased.

For closing the opening in the bottom forwardly of the scraper 124, an upwardly swinging gate 154 is provided. This gate is received between the side walls 155 and rearwardly of the front wall 157, which are connected to the frame members 10 and 12 and form the front end of the main body portion of the receptacle. The gate 154 is pivotally mounted by means of rearwardly extending arms 156 at each side thereof, each of which is pivotally attached to its adjacent side wall 155 by means of a pivot pin 158.

For raising the end gate 154 by pivoting it about the pins 158, a link 160 is pivotally attached by pivot pin 162 to a bracket 164 fixed to the gate member 154 at substantially its transverse center. The link 160 extends upwardly within the receptacle and is pivotally attached by means of a pivot pin 164 to the lower end of a crank lever 166. The lever 166 is pivoted at 168 to a bracket 169 which in turn is fixed to the cross member 14 at substantially its midpoint. The rear lower edge of the gate is thus adapted to swing from and against the blade 124 as the gate 154 is swung about its pivots 158.

For actuating the gate between open and closed positions, there is provided a hydraulic cylinder 170 which is pivotally mounted at its forward end by a pivot pin 172 to the forward end of the extension 86. The cylinder 170 has the usual piston rod 174 extending rearwardly therefrom which is pivotally attached at 176 to a bracket 178, which in turn is fixed to the lever 166. Upon retraction of the piston rod 174, the lever 166 is pulled upwardly about its pivot 168 and thus raises the link 160 upwardly and causes the gate 154 to move to its open position by pivoting about the pivot pins 158.

The bowl 104 is relatively long, and it will be evident that during the scraping operation the tendency will be for the dirt to pile up adjacent the front of the bowl or immediately behind the baffle 122. In order that the dirt which piles up behind the baffle 122 may be distributed within the bowl 104 so that the capacity of the bowl is materially increased, according to the present invention, a pivotally mounted floor member 180 is disposed within the bowl 104 and extends transversely thereof forming a load-supporting surface. The plate member 180 is curved as indicated at 182 adjacent the rear end thereof, and its rear edge is pivotally connected to a transversely extending pivot pin 184. The member 180 overlies the floor member 123 when it is in its lower position and extends over the top of the baffle 122.

When the elements of the scraper are in scraping position, as shown in Fig. 3, the member 180 is in its lower position and as the dirt passes up over the baffle, it is deposited onto the top surface of the member 180. When the dirt which is deposited on the member 180 has reached a maximum, means are provided for lifting the member 180 about the pivot pin 184 which serves to lift and deposit the dirt in the rear end of the bowl 104. Such lifting means is provided at each side of the bowl, and each of such means includes a hydraulic cylinder 186 which is pivotally mounted by a pivot pin 188 to an upstanding bracket 190 secured to the top edge of the bowl 104. The hydraulic cylinder 186 has a forwardly extending piston rod 192 which is pivotally connected by a pivot pin 194 at the front end thereof to a slide 196. Each slide 196 is adapted to slideably engage a trackway 197 formed along the longitudinal top edge of side walls 155 and is adapted to slide therealong as the piston rod 192 is extended and retracted.

A flexible cable 198 is connected at one end to a pin 200, which is fixed to the piston rod 192 for movement therewith. The cable 198 extends over a pulley 202 which is pivotally mounted to the cylinder 186, and then extends forwardly and is connected at 204 to the plate member 180 at midpoints between the front and rear edges thereof.

As the piston rods 192 are moved from the position indicated in Fig. 3 to the position shown in Fig. 4, the cables 198 are pulled forwardly so that the member 180 is raised from the position shown in Fig. 3 to the position shown in Fig. 4. Any dirt supported on the member 180, when in the position shown in Fig. 3, will thus be deposited in the rear of the bowl 104. The scraping operation may then continue so that the dirt is deposited on the floor member 123 forwardly of the member 180, in its upward position. When in its upward position, the curved portion 182 adjacent the base assists in the distribution of the dirt forwardly of the member 180 so that the capacity of this portion is also increased.

When the piston rod 192 has been moved to its forwardmost position, as shown in Fig. 4, a latching mechanism is provided for latching the slide 196 and holding the slide in this position so that the member 180 is retained in its upright position and also serving as part of the means for pivoting the bowl 104 to dumping position as will become more apparent from later description. This latching mechanism includes a pivotally mounted finger 206 which is pivotally mounted on a vertical pivot pin 208. The pivot pin 208 is fixed to the top of the frame member beside the wall member 155. A compression coil spring 210 is disposed between the outer surface of the wall 155 and the adjacent edge of the finger 206 and is suitably fixed in position so that the finger 206 is normally urged outwardly to its out-of-engagement position. A bell crank lever 212 is pivotally mounted to a vertical pivot pin 214, which in turn is fixed to a bracket 216 mounted on the frame member 10. The bell crank 212 has a cam arm 218 which is adapted to engage the outer edge of the finger 206 and urge the finger inwardly to its latching position when the lever 212 is drawn forwardly. Hand operating means are provided for actuating the bell crank 212 which include a rod member 220 pivotally connected by pivot pins 222 to the forward end of the bell crank lever 212. Each rod 220 extends forwardly of the vehicle and is pivotally connected to the lower end of a lever 224. Each lever 224 is fixedly secured to a pivot rod 225 which extends transversely of the scraper and is pivotally mounted adjacent the sides thereof to upstanding brackets 226 which may be fixed to the side frames 10 and 12.

Another lever 228 is fixedly connected to the shaft 225 intermediate its ends and has pivotally connected to the lower end thereof, by a pivot pin 230, a forwardly extending operating rod 232. The operating rod 232 may be extended to a suitably convenient location so that it may be operated by the vehicle operator to move the fingers 206 to latching or non-latching positions.

The hydraulic means 186 also serves to tilt the bowl 104 to the position shown in Fig. 5, so that the contents thereof may be dumped. As mentioned above, when the piston rods 192 are extended to the position shown in Fig. 4, the slides 196 are moved forwardly so that the fingers 206 may be placed in the latching position, as shown in Fig. 6. The floor member 180 is then in its raised position as shown in Fig. 4. When it is desired to dump the contents of the bowl 104, the cylinder 186 may be so actuated that fluid under pressure is forced into the cylinder at the forward end of the cylinder so that the piston rod 192 is retracted. As the latches 206 are in engagement with the slides 196, the forward ends of the piston rods 192 are fixed relative to the frame and retraction of the piston rods within the cylinders will result in tilting the bowl to the position shown in Fig. 5. At the same time, the cable 198 will permit the plate member 180 to drop by gravity so that all of the contents of the bowl may be dumped therefrom. At the same time, the forward end of the extension 86 is raised and the piston rod 174 is retracted to raise the gate 154.

In Figs. 8 to 11, a modified form of structure is illustrated in which the scraper is generally of the same type as that disclosed above but in which the main body portion of the scraper includes an intermediate section, a rear section, and a forward part in which the intermediate and rear sections may both be separated from and tilted relative to each other. The intermediate section includes side wall members 240 and 242 connected together by a bottom member 244. This section is open at its top, front, and rear, and is pivotally swung between the frame members 10 and 12 on pivot pins 246. The baffle 122 and scraping element 124 are mounted along the leading edge of the bottom 244 in the same manner as described above.

The front section of the main body portion is formed by the side walls 155, front wall 157, with the gate 154 mounted therein in the same way as in the embodiment described above.

The rear section of the receptacle is in the form of a bowl 250, which is generally of the same shape as the bowl 104 above described but which is substantially shorter. The bowl 250 is suspended within the rearward part of the main frame on pivot pins 252 which may be fixed to the frame members 10 and 12. A transversely extending stop 254 may be fixed to the rear wall of the bowl 250 and is adapted to abut against the top surface of the transverse frame member 16, so as to limit the downward movement of the bowl 250 about its pivot.

The rear edges of the intermediate section, that is, the rear edges of the side walls 240 and 242 and the rear edge of bottom wall 244 overlie the front edges of the bowl 250.

The scraping is accomplished by the scraping element 124 when the parts are in the position shown in Figs. 9 and 10, so that the scraper blade is below the normal ground surface. The dirt scraped passes up over the baffle and is deposited within the receptacle therebehind. So that the dirt may be distributed within the receptacle, a movable member is provided in this embodiment as in the embodiment described above. The movable member is in the form of a transversely extending plate member 180, similar to that described above, which is pivotally mounted on a transversely extending pivot pin 184. The pivot pin 184 is received within the side walls 240 and 242 adjacent the floor 244, so that the member 180 may be pivoted relative to the floor of the intermediate section.

The member 180 is lifted from the position shown in Fig. 9 to that shown in Fig. 10 by means of a hydraulically operated mechanism through connecting linkage members. A hydraulic cylinder 260 is disposed on each side of the intermediate section and may be pivotally connected to the side walls 240 and 242, respectively, by means of pivot pins 262. Each cylinder has the usual piston rod 264 associated therewith which may be pivotally connected by means of a pivot pin 266 through an elongated slot in an arm 268 of a bell crank lever. The bell crank lever is pivotally connected by a pivot pin 270 to its respective side wall 240 or 242, and the other arm 272 of the bell crank lever extends downwardly within the receptacle along its side for pivotal connection to one end of a connecting link 274. The lower end of the connecting link 274 may be pivotally connected through a pivot pin 276 to a bracket 278 which may be fixedly secured to the top surface of the member 180.

It is evident that by rearward movement or extension of the piston rod 264 that the member 180 is raised from the position shown in Fig. 9 to a substantially upright position as shown in Fig. 10 through the linkage members 266, 268, and 274. The piston rod 264 is power actuated in both directions so that the member 180 may be power lowered to its position shown in Fig. 9 from that shown in Fig. 10.

In order to tilt the intermediate and rear sections of the receptacle to the dumping position shown in Fig. 11, a hydraulically operated cylinder 280 is disposed at each side of the structure. Each hydraulic cylinder may be pivotally mounted by a pivot pin 282 to the side wall of the bowl 250 and has the usual piston rod 284 associated therewith which may be pivotally connected at its forward end to the side walls 240 and 242, respectively, adjacent the front edges thereof and near the top. A linkage member 290 is pivotally connected by a pivot pin 292 to an integral upward extension 294 on each of the side walls 240 and 242. The link 290 is pivotally connected at its rear end through a lost motion connection by a pivot pin 296 to an upstanding bracket 298 which may be secured to the top edge of the bowl 250 adjacent the rear thereof on each side of the bowl.

When the piston rod 284 is extended, the intermediate section is tilted about its pivot pin 246 and when so tilted, the link members 290 tilt the bowl 250 about its pivot pins 252 so that the contents of the receptacle may be dumped.

In Figs. 12, 13 and 14 is shown an improved means for guiding material entering the forwardmost receptacle, upwardly and rearwardly into the rearmost receptacle 250, and comprises a downwardly and forwardly inclined baffle plate 300 which is welded or otherwise rigidly secured along its upper edge to a horizontally disposed bar or rod 302, the opposite ends of which are journaled in sockets 304 and 306 which are mounted on the inner sides of the upstanding side walls 240 and 242. The baffle plate 300 is freely swingable on its mountings and the lower forward edge thereof rests on the bottom 244 of the receptacle in which it is mounted, rearwardly of the cutting blade 124, so that material entering the receptacle over the cutting blade at the middle part of the receptacle is guided upwardly and rearwardly so as to fall by gravity into the rearmost receptacle, as shown in Fig. 12 of the drawings.

In this way the rear receptacle 250 may be more fully and easily loaded than where the dirt or other material entering the front receptacle is caused to pass over a quantity of dirt already piled therein. It is well known in the art that it is difficult for earth, particularly certain kinds, to slide over an already deposited pile of the same material, whereas the same character of material will slide easily over a smooth polished metal surface.

It is to be noted that the width of the baffle plate 300 is materially less than the width of the receptacle in which it is mounted so as to provide spaces 308 and 310 at each side of the baffle plate into which dirt may pass and fill up the forwardmost receptacle, as well as pile in underneath and behind the baffle plate.

At the time of dumping the baffle plate, being freely swingable, hinges about its horizontal pivotal mounting and earth or other material underneath or back of the plate readily empties itself, at which time the baffle plate will swing back into position, as shown in Fig. 13 of the drawings. The bulk of the material which has been guided by the baffle plate upwardly and rearwardly into the receptacle 250 is, of course, emptied directly from that receptacle.

In using a free swingable baffle plate of the character disclosed, it is, of course, unnecessary to provide any hydraulic ram or other operating means for actuating the baffle, thus materially simplifying and reducing the cost of the structure.

Formal changes may be made in the specific embodiments of the invention described without departing from the spirit and substance of the invention, the scope of which is commensurate with the appended claims.

What is claimed is:

1. A scraper structure including a main body portion of box-like form providing a transporting receptacle, a scraper element transversely attached to the main body portion intermediate the ends thereof, a baffle member within the main body portion adjacent the bottom thereof extending transversely of said body portion to the rear of said scraper element, a movable plate member disposed within said receptacle over the floor thereof having the forward end of said movable member adjacent the top of said baffle member forming a load-supporting surface, means pivotally mounting said movable member to said receptacle adjacent the rear of said movable member, and means for pivoting said movable member about said last-named means to distribute the load to the rear of said receptacle.

2. A scraper structure including a main body portion of box-like form providing a transporting receptacle, a scraper element transversely attached to the main body portion intermediate the ends thereof, a member disposed within said receptacle over the floor thereof and adjacent said element forming a load supporting surface, means pivotally mounting said member to said receptacle adjacent the rear of said member, means connected to said member to pivot said member from a position overlying said floor to an upright position, and means associated with said last named means to latch said member in its upright position.

3. A scraper structure comprising means forming a transporting receptacle, said means including a body portion, a bowl pivotally mounted relative to the body portion at the rear thereof and a swinging gate pivotally mounted relative to the body portion adjacent the front thereof, a transversely extending scraper element fixed to said body portion along the leading lower edge thereof, a member disposed within said body portion over the floor thereof and adjacent said element forming a load supporting surface, means pivotally connecting said member to said body portion adjacent the rear of said member, and means for pivoting said member about said last named means to shift the load from within the main body portion into the bowl.

4. A scraper structure including a frame, a body portion of box-like form providing a transporting receptacle pivotally attached to said frame, a scraper element transversely attached to the lower leading edge of said body portion, a member disposed within said receptacle over the floor thereof and adjacent said element forming a load-supporting surface, means pivotally mounting said member to said receptacle adjacent the rear of said member, means connected to said member to pivot said member from a position overlying said floor to an upright position, said last-named means including a power cylinder having the rear end thereof attached to said receptacle, a forwardly extending reciprocating piston associated with said cylinder, means pivotally and slidably connecting the forward end of said piston relative to said frame, means providing a flexible connection between said reciprocating piston and said member, and means to latch said reciprocating piston in its forward position.

GEORGE B. WOOD.